Patented Mar. 5, 1935

1,993,415

UNITED STATES PATENT OFFICE 1,993,415

SULPHONATED POLYMERIZED TERPENE AND METHOD OF PRODUCING SAME

Alfred L. Rummelsburg and Bunyan H. Little, Wilmington, Del., assignors to Hercules Powder Company, Wilmington, Del., a corporation of Delaware No Drawing. Application August 22, 1931, Serial No. 558,832

24 Claims. (Cl. 260—159)

This invention relates to sulphonated dipolymer and a method of preparing the same.

Dipolymer, as the term is herein employed, is a product consisting of polymerized terpene hydrocarbons, and is produced by the polymerization of dipentene, turpentine or pine oil by various methods, for example, those outlined in the patents to Irvin W. Humphrey, Numbers 1,691,065, 1,691,067, 1,691,068 and 1,691,069, dated November 13, 1928. The term is herein used to broadly designate substances of this type. It is found that this dipolymer may be converted into a water soluble product upon treatment with concentrated or fuming sulphuric acid or chlorsulphonic acid, the product being capable of forming metallic salts. Both the product, hereafter called sulphonated dipolymer, and its alkali salts are found to be very effective as wetting-out agents; that is, when added to water or various aqueous solutions, they enable fibres, powders, or other substances to be wetted more readily than would otherwise be the case. For example, they promote the speed and efficiency with which wool may be wetted, and they also make possible the pasting of dyestuff powders, etc., which are sometimes very difficult to paste with water alone. Since both the acidic dipolymer and its calcium, magnesium and similar salts are somewhat soluble in water, it, or its derivatives, may be used in acidic solutions and hard water as contrasted with soap which, though an efficient wetting-out agent, cannot be used under these conditions.

In the performance of the sulphonation process the sulphuric acid may be added to the dipolymer by agitation, but preferably the dipolymer is added to the sulphuric acid which may be about 95% H₂SO₄ in the course of about 2.5 hours, after which the mixture is agitated, at around 20° C. for about 15 hours. The acid may range in strength from about 90% to 105% and the temperature from 0° C. to 120° C. Likewise, the period of agitation may considerably vary from 5 to about 50 hours and the weight of the acid may be from one to ten times that of the dipolymer. Preferably, however, it is two to four times that amount. Catalysts such as the sulphates of nickel, silver, or mercury may be added to increase the rate of reaction during the sulphonation. After the period of agitation is completed, the mixture is slowly added with agitation to sufficient water to give a 40 to 50 per cent aqueous solution of H₂SO₄. An oil containing unchanged dipolymer and sulphonated dipolymer rises to the surface of the dilute acid. Varying proportions may be used, but, nevertheless, only a small amount of sulphonated product will be dissolved by the dilute sulphuric acid. The oil layer can be separated from the dilute acid either by drawing off the latter or by extracting with a suitable water immiscible solvent such as benzene or gasoline. The oil may also be separated by centrifuging. Instead of diluting with water separation may be effected either by long standing of or by centrifuging the sulphonated mixture. The crude product thus obtained may be worked up in one of several methods of which the following are examples.

According to one method the oil is dissolved in several volumes of either benzene or low boiling petroleum hydrocarbons and is then given one or more washes with a concentrated solution of a salt, such as sodium chloride or sodium sulphate, which does not possess an alkaline reaction. Ordinarily, a 10 to 25 per cent sodium chloride solution may be used to remove the residual sulphuric acid from the oil and avoid the solution of the sulphonated dipolymer in the water. The solvent is then evaporated under reduced pressure preferably at a temperature below 100° C. and the sulphonated dipolymer extracted from the distillation residue with ethyl alcohol, methanol or other suitable solvent, 92% by volume ethyl alcohol being usually employed. The alcohol is then evaporated from the extract under reduced pressure, leaving the sulphonated dipolymer. The non-sulphonated dipolymer is practically insoluble in alcohol.

In another process, instead of dissolving the oil in the water immiscible solvent, it may be washed directly one or more times with the sodium chloride solution employing, for example, successively 20%, 10% and 5% salt solutions. The crude sulphonated product is then extracted with the alcohol, anhydrous ethyl alcohol being employed if it is desired to obtain the product practically free from sodium chloride. The alcoholic solution may then be evaporated as in the first mentioned method giving the free sulphonic acid.

Instead of either of the above, the oil after separation from the dilute acid may be agitated with sufficient dilute aqueous sodium hydroxide or sodium carbonate to neutralize it, converting the sulphonated dipolymer into its sodium salt. The non-sulphonated dipolymer is then removed by extracting with either benzene or gasoline.

The free sulphonic derivative where necessary may in some instances be neutralized after solution in water. However, it is generally preferable to neutralize the above mentioned alcoholic extract by adding the requisite amount of aqueous 10–50% sodium hydroxide solution, then filtering. The sodium salt of the sulphonated product may then be obtained in a substantially anhydrous condition by evaporating off the solvent alcohol at a temperature below 110° C. An aqueous solution containing from 2 to 10 g. per liter of sodium sulpho derivative then comprises the wetting out solution.

The sulphonation of the dipolymer may also be carried out by dissolving it in an inert solvent, preferably petroleum hydrocarbons, boiling between 60–80° C. After sulphonation and removal of excess acid the solvent may be removed by means of distillation.

Chlorosulphonic acid or fuming sulphuric may be used instead of concentrated sulphuric acid for the sulphonation.

Neutralization of the product may be effected by the use of potassium hydroxide, sodium or potassium carbonate, or ammonia instead of sodium hydroxide if desired.

A specific typical method of preparing the sulphonated dipolymer is as follows:

700 grams of dipolymer are added dropwise with agitation to 1400 grams of 95% $H_2SO_4$ at 20° C. in the course of 2.5 hours, agitation then being continued at 20° C. for 15 hours. The product is then added slowly with agitation to 2.5 liters of water. The oil layer is separated, washed with two liters of saturated sodium chloride solution and finally with two liters of 10% sodium chloride solution yielding 850 grams of crude sulphonated product. The latter is extracted with 1200 cc. of 92% alcohol then with 500 cc. of alcohol, the extracts being combined, neutralized with a suitable alkali, as aqueous sodium hydroxide (10%), the sodium sulphate filtered off and the alcohol evaporated below 90° C. leaving 280 grams of the dry sulphonated dipolymer, containing 6.0% sulphur and having a sodium content of 4.7%. The final product is chiefly the sodium salt of a mono-sulphonated derivative of dipolymer. The dipolymer which is sulphonated consists largely of diterpene along with small proportions of tri- and higher polymers. That portion of the crude dipolymer which is insoluble in alcohol may be sulphonated by retreatment with stronger sulphuric acid or by using more elevated temperatures.

As a further example 300 g. dipolymer are added to 500 g. 105% sulphuric acid during a period of one-half hour with agitation, allowing the temperature to rise slowly until when the last of the dipolymer has been added a temperature of 60° C. prevails. The agitation is continued with heating at 80–100° C. for several hours until complete sulphonation has occurred. The mixture is then cooled, and enough water added with cooling and agitation to give a 50% acid solution. The precipitated free sulphonic acid is separated, re-dissolved in one liter of water, and neutralized with sodium hydroxide. The sodium sulpho derivative is then salted out of solution by adding enough sodium chloride to make a 15% salt solution. It is filtered off and dried, giving 260 g. water soluble product. The yield will, however, vary according to conditions of operation, degree of sulphonation, etc. and the sulphur content of the product will range from 2 to 14%.

Instead of the above method the free sulphonic acid may be redissolved in water, treated with calcium carbonate, filtered, then treated with sodium carbonate until slightly alkaline to litmus, and again filtered. The sodium sulpho derivative may then be obtained by evaporation.

Instead of using the mixed polymerized terpenes, the pure diterpene or higher polymers may be employed. The dipolymer may be obtained as pointed out above by heat treatment of terpenes such as pinene, dipentene, etc., or by heat treatment in conjunction with a polymerization catalyst such as fuller's earth, stannic chloride or the like. The dipentene may be obtained by first dehydrating either terpineol or pine oil and then polymerizing the terpenes. The dipolymer as employed for sulphonation may contain a considerable portion of pine oil components.

Sulphonated dipolymer when refined is a solid. As noted above, its alkali and alkaline earth salts are somewhat soluble in water. The sodium salt is a light brown amorphous product readily soluble in water.

What we claim and desire to protect by Letters Patent is:

1. The process of preparing a sulphonated polymerized terpene product which includes reacting a polymerized terpene with a sulphonating acid.

2. The process of preparing a sulphonated polymerized terpene product which includes reacting a polymerized terpene with a sulphonating acid and neutralizing the reaction product.

3. The process of preparing a sulphonated polymerized terpene product which includes reacting a polymerized terpene with concentrated sulphuric acid at a temperature approximately 0° C.–120° C.

4. The process of preparing a sulphonated polymerized terpene product which includes reacting a polymerized terpene with concentrated sulphuric acid.

5. The process of preparing a sulphonated polymerized terpene product which includes reacting a polymerized terpene with concentrated sulphuric acid at about 20° C.

6. The process of preparing a sulphonated polymerized terpene product which includes reacting a polymerized terpene with a sulphonating acid, diluting the reacted mixture with water and separating the crude sulphonated product from the dilute acids.

7. The process of preparing a sulphonated polymerized terpene product which includes reacting a polymerized terpene with a sulphonating acid, diluting the reacted mixture with water, separating the crude sulphonated product from the dilute acids and neutralizing the sulphonated product.

8. The process of preparing a sulphonated polymerized terpene product which includes reacting a polymerized terpene with a sulphonating acid, diluting the reacted mixture with water and separating the crude sulphonated product from the dilute acid by extraction with a water immiscible solvent for the sulphonated product.

9. The process of preparing a sulphonated polymerized terpene product which includes reacting a polymerized terpene with a sulphonating acid, diluting the reacted mixture with water, separating the crude sulphonated product from the dilute acid and removing acid from the sulphonated product by washing with a salt solution.

10. The process of preparing a sulphonated polymerized terpene product which includes reacting a polymerized terpene with concentrated sulphuric acid, diluting the reacted mixture with water, separating the crude sulphonated product from the dilute acids, and removing acid from the sulphonated product by washing the solution with a salt solution and extracting the sulphonated product with a selective solvent therefor.

11. The process of preparing a sulphonated polymerized terpene product which includes reacting a polymerized terpene with a sulphonating acid, diluting the reacted mixture with water, separating the crude sulphonated product from the dilute acids, and extracting the sulphonated product from the crude mixture by means of a selective solvent for the sulphonated product.

12. The process of preparing a sulphonated polymerized terpene product which includes reacting a polymerized terpene with a sulphonating acid, diluting the reacted mixture with water, separating the crude sulphonated product from the dilute acids, extracting the sulphonated product from the crude mixture by means of a selective solvent therefor and neutralizing the sulphonated product.

13. The process of preparing a sulphonated polymerized terpene product which includes reacting a polymerized terpene with a sulphonating acid, diluting the reacted mixture with water, separating the crude sulphonated product from the dilute acids, and extracting the sulphonated product from the crude mixture by means of ethyl alcohol.

14. The process of preparing a sulphonated polymerized terpene product which includes reacting a polymerized terpene with a sulphonating acid, diluting the reacted mixture with water, separating the crude sulphonated product from the dilute acid, removing acid from the sulphonated product by washing with a salt solution, and extracting the sulphonated product from the crude mixture by means of a selective solvent for the sulphonated product.

15. The process of preparing a sulphonated polymerized terpene product which includes reacting a polymerized terpene with a sulphonating acid, diluting the reacted mixture with water, separating the crude sulphonated product from the dilute acid, removing acid from the sulphonated product by washing with a salt solution, and extracting the sulphonated product from the crude mixture by means of ethyl alcohol.

16. The process of preparing a sulphonated polymerized terpene product which includes reacting a polymerized terpene with a sulphonating acid, diluting the reacted mixture with water, separating the crude sulphonated polymerized terpene from the dilute acid, and converting the sulphonated polymerized terpene into a salt thereof.

17. A sulphonated polymerized terpene.

18. A salt of a sulphonated polymerized terpene selected from the group consisting of alkali metal, alkaline earth metal, and ammonium salts of sulphonated polymerized terpenes.

19. An alkali metal salt of a sulphonated polymerized terpene.

20. An alkaline earth metal salt of a sulphonated polymerized terpene.

21. A sulphonated polymerized terpene containing from 4–14% combined sulphur.

22. A sodium salt of a sulphonated polymerized terpene.

23. An ammonium salt of a sulphonated polymerized terpene.

24. A calcium salt of a sulphonated polymerized terpene.

ALFRED L. RUMMELSBURG.
BUNYAN H. LITTLE.